Aug. 29, 1933.  A. O. BUCKIUS  1,924,270
ROLLER BEARING JOURNAL BOX
Filed Oct. 8, 1927  5 Sheets-Sheet 1

Inventor:
Albert O. Buckius
By his Attorney
Clarence B. Kerr

Inventor:
Albert O. Buckius
By his Attorney

Patented Aug. 29, 1933

1,924,270

UNITED STATES PATENT OFFICE 1,924,270

ROLLER BEARING JOURNAL BOX

Albert O. Buckius, Cleveland, Ohio, assignor to National Malleable and Steel Castings Company, Cleveland, Ohio, a Corporation of Ohio Application October 8, 1927. Serial No. 224,804

9 Claims. (Cl. 308—41)

My invention relates to roller bearing journal boxes, and comprises a box provided with means for taking both inward and outward axle end thrusts against the box parts. My invention is particularly adapted for use in connection with the present flexible type of freight car trucks, where a substantial amount of flexibility is provided between the two side frames of the truck because of its ability to take up end thrusts in either direction. My improved box also provides novel retaining ring, thrust block and cover parts and comprises as well various features which I shall hereinafter describe and claim.

Figure 1:
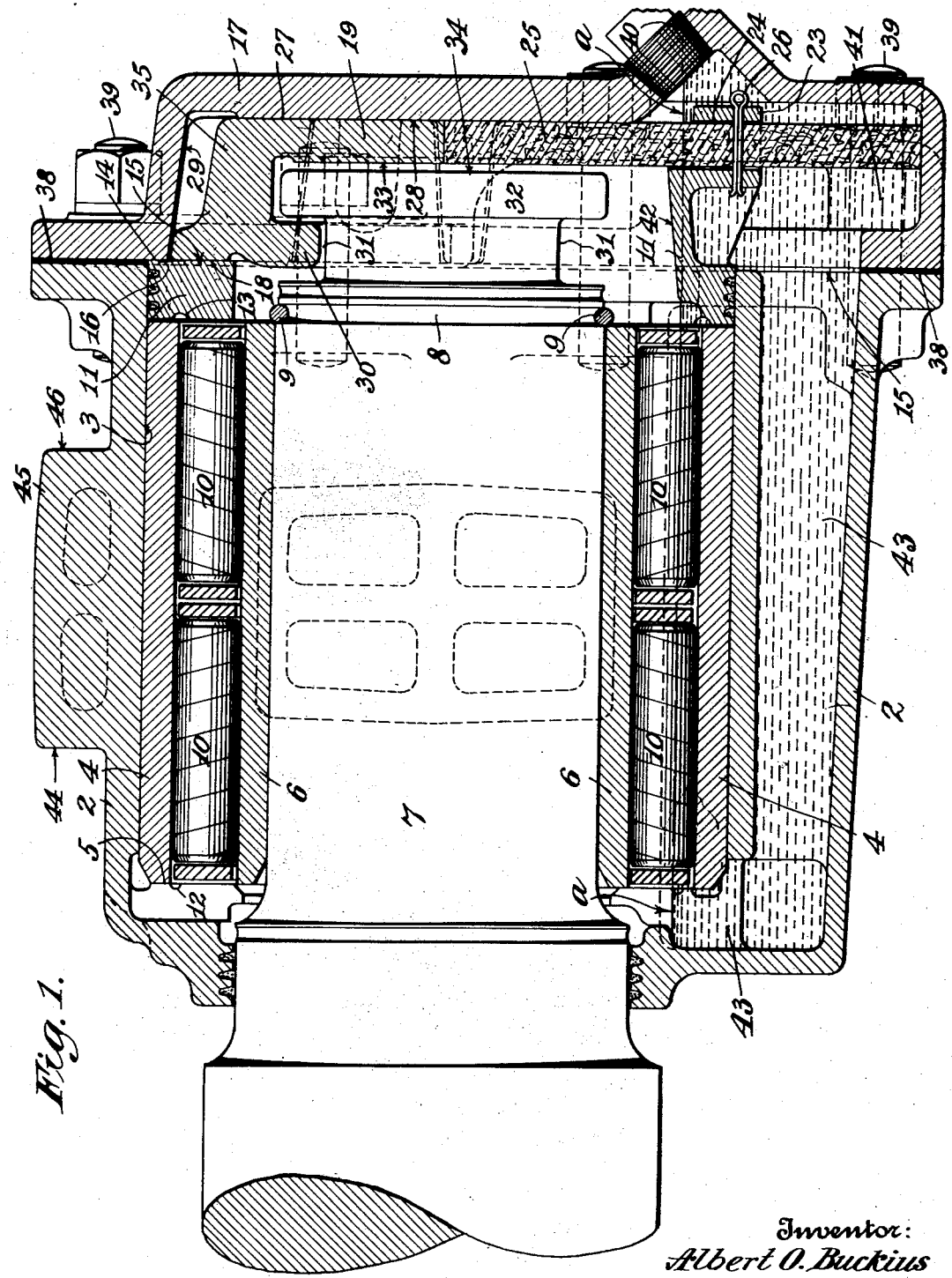
Figure 2:
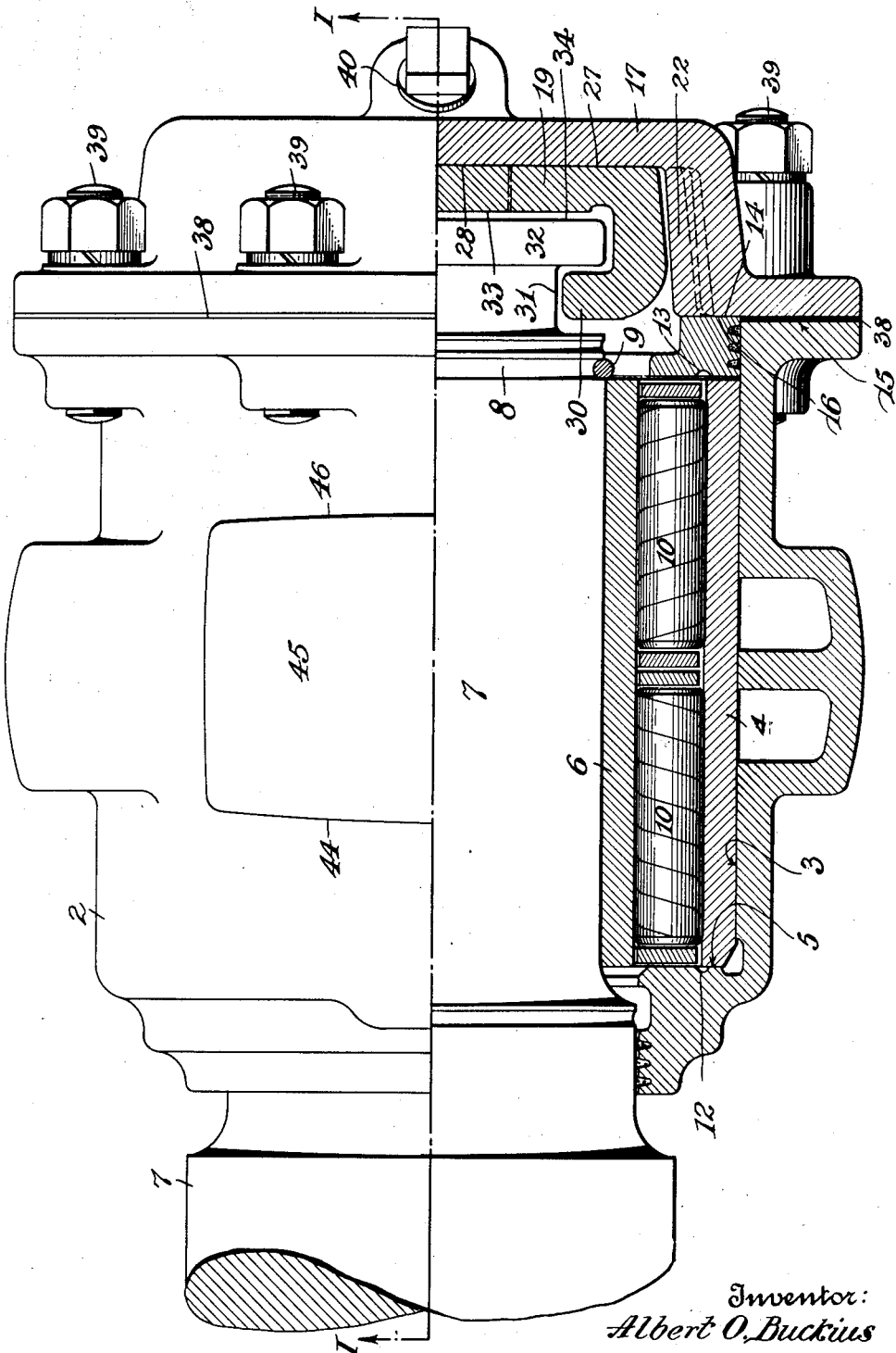
Figure 3:
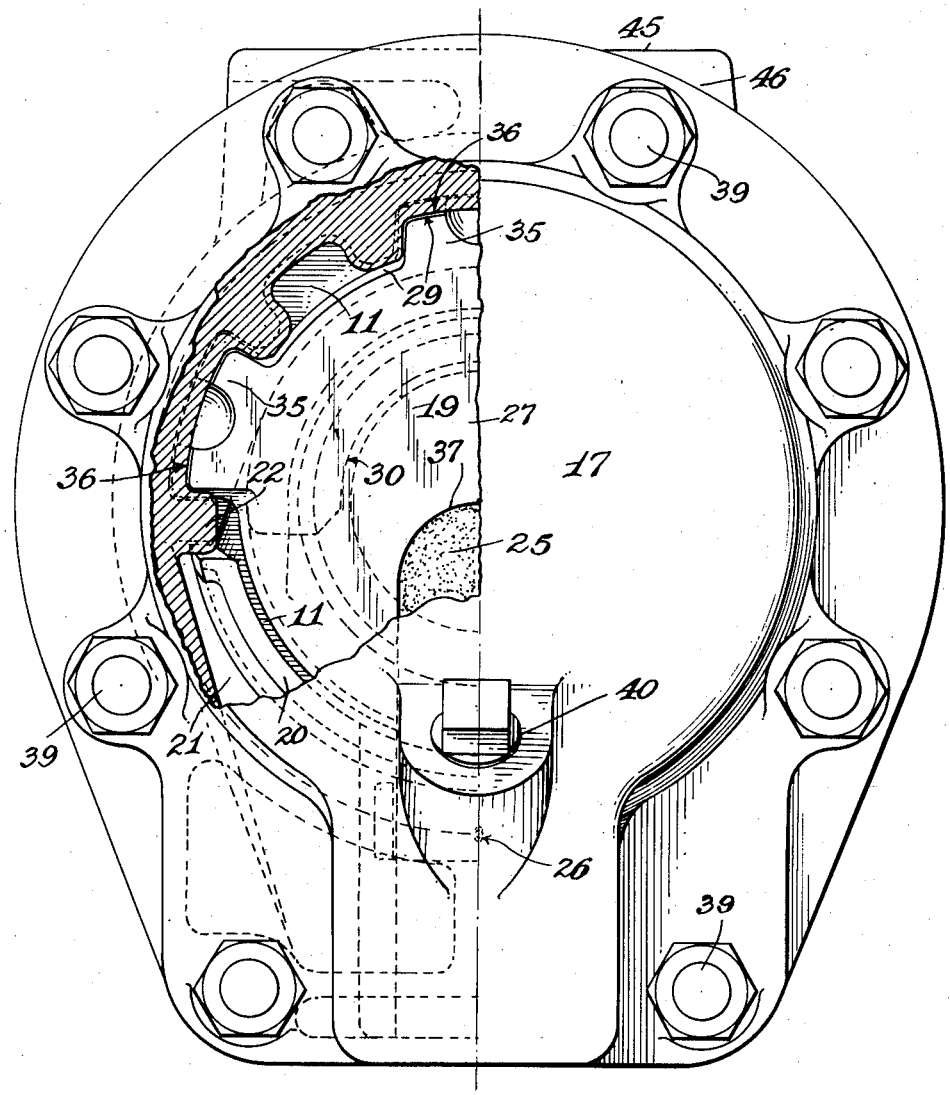
Figure 4:
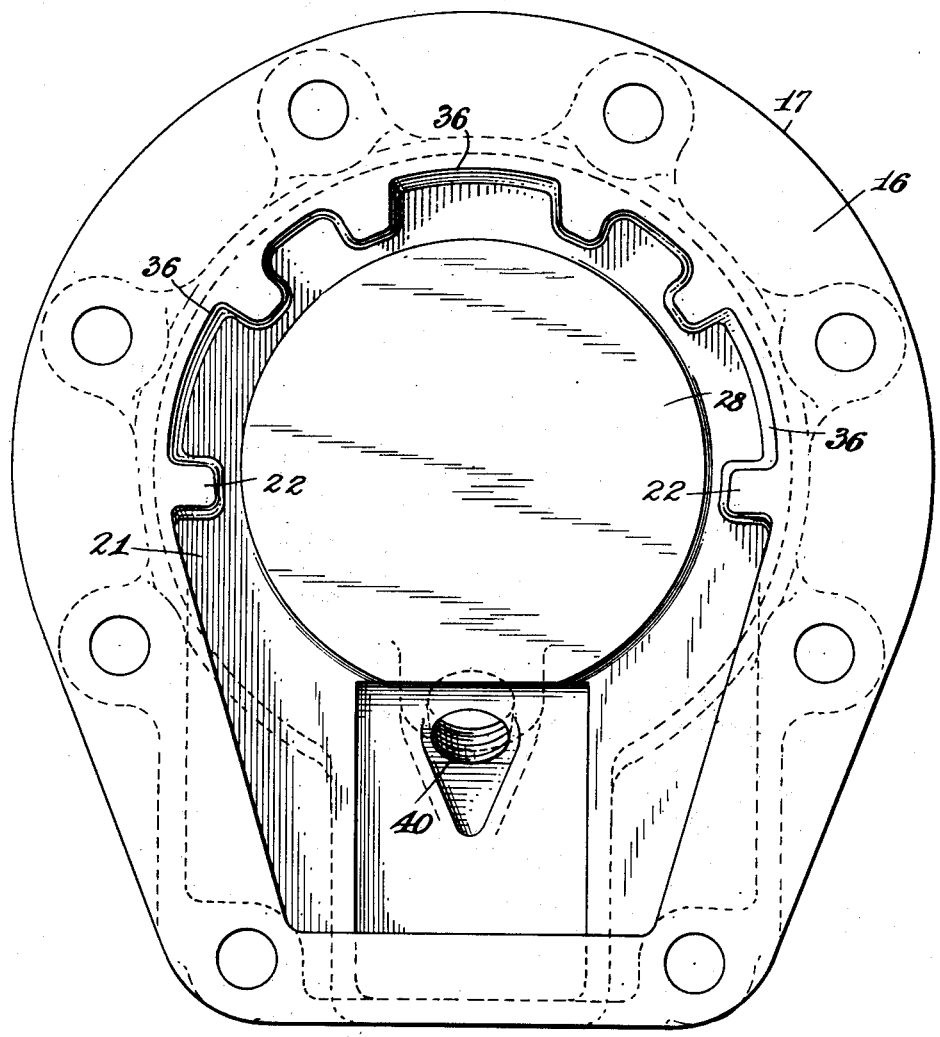
Figure 5:
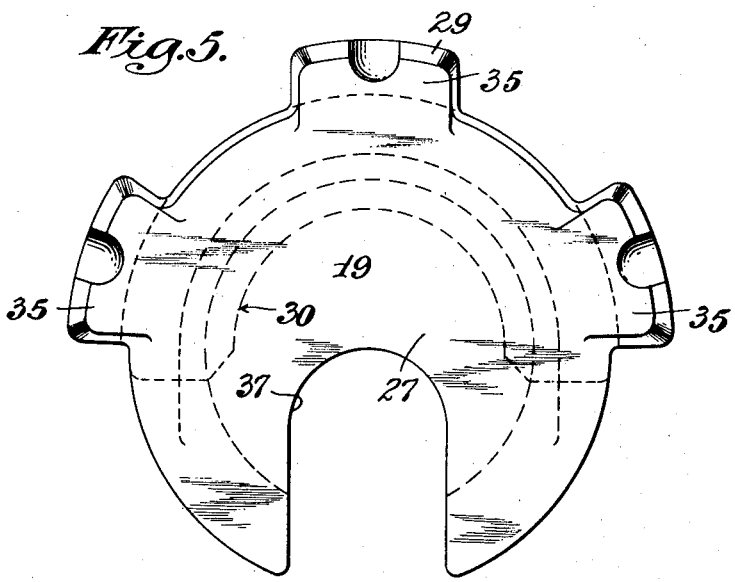
Figure 6:
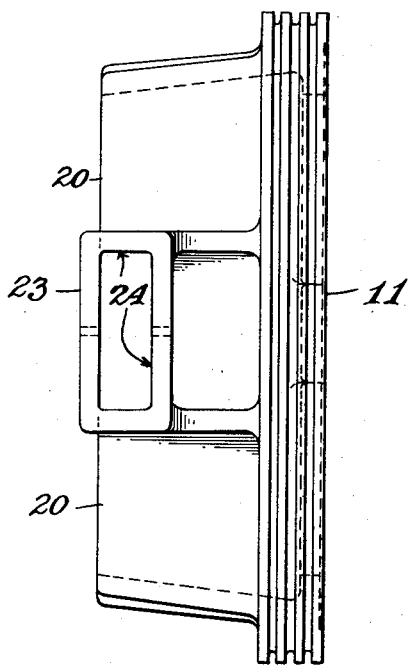

In the accompanying drawings, Fig. 1 is a vertical section, on line I—I of Fig. 2, of a journal box embodying my invention; Fig. 2 is a plan, partly in section thereof; Fig. 3 is an end elevation thereof, partly in section; Fig. 4 is an elevation of the inside of the cover; Fig. 5 is an elevation of the outer side of the thrust block; and Fig. 6 is a plan of the retaining ring.

Referring more specifically to the drawings, the box 2 has tightly pressed against its inner surface 3 the outer roller bearing race 4, which at its inner end bears against the shoulder 5 on the box. The inner race 6 preferably has a press fit with the axle 7, which may be equipped with a groove 8 to receive a snap ring 9, which provides additional means for holding the race 6 in position. The roller bearings 10, of which I have shown two sets, are held in position between the races 4 and 6 by the shoulder 5 on the box and the retaining ring 11, which also holds the outer race in position. The shoulder 5 and ring 11 are recessed at 12 and 13 respectively to prevent the rollers 10 from wearing shoulders thereon. The outer face 14 of the retainer ring 11 lies almost flush with the surface 15 which lies in the plane of the mouth of the box and is held in position by being engaged by the inward portion of the bearing face 16 of the cover 17 against the mouth of the box. The retainer ring 11 also provides a bearing for the inner face 18 of the thrust block 19. The retainer ring 11 in its lower circumference is provided with arc-shaped ribs 20 which seat in similarly shaped recesses 21 in the inner face of the cover 17 and bear at their ends against the shoulders 22 thereon. These ribs 20, recesses 21 and shoulders 22 are for the purpose of preventing rotation of the retaining ring 11 with the axle 7.

The lower portion of the ring 11 has also an outward extension 23 with a vertically extending aperture 24 therethrough for the wick 25, which may be secured and supported therein by the cotter 26.

The thrust block 19 bears on its inner face 18 against the retainer ring 11 and on its outer face 27 against the inner face 28 of the cover 17, while clearance is provided between the radial surfaces 29 of block 19 and the corresponding surfaces on the cover to permit the cover 17 to be drawn down over the block 19 against the surface 15 of the box 2. The block 19 has a semi-circular projection 30 intended to seat in the recess 31 behind the annular shoulder 32 formed on the end of the axle and to bear upon such shoulder 32 and thereby take up endwise outward thrusts of the box relative to the axle, while the inward thrusts of the box relative to the axle are taken up by the face 33 of the block 19, which bears upon the end face 34 of the axle.

To prevent rotation of the thrust block 19 with the axle and relative to the cover 17, the block 19 has a plurality of radially extending lugs 35 which fit into corresponding recesses 36 in the inner face of the cover. The block also has a central recess or slot 37 in its lower portion for reception of the upper end of the wick 25.

The cover 17 is secured against the gasket 38 on the surface 15 of the housing 2 by the stud bolts 39, which are tapped into the housing. As the cover is drawn inwardly by the bolts 39 it will be seen that the surface 15 will engage the outer face 14 of the retaining ring 11 and hold it in position while permitting sufficient clearance to provide a take-up between the parts as the gasket 38 is compressed. The cover has the usual oil charging hole 40 and when filled the oil reaches the level indicated by the line a—a. If the oil level falls below the level of the lowermost rollers 10, the oil will be led from the sump 41 in the bottom of the box by the wick 25 to the end face 34 of the axle 7. It will then run off or be thrown off the axle against the inner annular surface 42 of the retainer 11 by the inclination of which it will be directed to the rollers 10. After passing through the roller path the oil will return through the bottom passage 43 to the sump 41.

It will be seen that the inner surface 18 of the thrust block 19 lies substantially in the plane of the mouth 15 of the box, and that accordingly the cover 17 is made to contain the thrust block 19. This facilitates the application and removal of the cover 17 and the thrust block 19, since it permits the cover to be taken off by an endwise movement when the stud bolt nuts have been removed and the thrust block 19 may then be lifted vertically to clear its projection 30 from the shoulder 32 on the end of the axle 7 without interference from the axle or any of the parts of the box.

It will also be seen that the meeting surfaces 15 and 16 of the box and cover are of a character to be brought to bearing by the usual grinding operation, and that no special machining is required.

With the improved box shown in Fig. 1, an end thrust to the right tends to pull the box off the axle 7, for the reason that the force is transmitted from the side frame (not shown) through the inner face 44 of the top lug 45 of the box, from the box to the outer race 4, from the outer race to the retaining ring 11, from the retaining ring 11 to thrust block 19, and is resisted by the engagement of the projection 30 on the thrust block against the shoulder 32 on the end of the axle. End thrust in the opposite direction, to the left in Fig. 1, is conveyed from the side frame (not shown) to the box through the outer face 46 of the top lug 45 and is transmitted to the cover 17 through the stud bolts 39, and from the cover 17 to the thrust block 19, and from the lubricated face 33 of the thrust block 19 to the end 34 of the axle. It is thus obvious that boxes made in accordance with this invention adequately take care of end thrusts in either direction, and that it is impossible for such boxes to slip off the axle regardless of the type of truck or the amount of flexibility existing between the side frames of such truck.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a roller bearing journal box, an axle having a shouldered end, rollers interposed between said axle and said box, a lid for said box, an end thrust block between the end of said axle and the inner face of said lid for receiving thrust in one direction, said block engaging the inner surface of said lid and being normally out of contact with the end of said axle an extension on said end thrust block extending about the shouldered end of said axle for receiving end thrust in the opposite direction, said thrust block being applied to and removed from said axle by movement in a plane transverse to the axis of said axle, said lid and box meeting in a plane inward of the said extension of the thrust block, whereby removal of said lid allows removal of said thrust block without interference with said box.

2. In a journal box having roller bearings arranged between the journal and the housing, a removable end closure for the box, and a thrust block having bearings on the journal and seating directly against that portion of the closure which lies opposite the end of the journal, and means on said journal cooperating with said thrust block to take up end thrusts in either direction said closure when applied serving to clamp said thrust block in position.

3. In a journal box having roller bearings arranged between the journal and the housing, a removable end closure for the box, and a thrust block positioned directly between the closure and the end of the journal and having a broad, flat bearing substantially coextensive with and engaging the end of the journal and a bearing of at least equal extent upon the closure, means on said journal providing another bearing for said thrust block, the said bearings being so arranged as to take up end thrusts in opposite directions.

4. In a journal box having roller bearings arranged between the journal and the housing, a removable cover for said box rigidly secured thereto, a thrust block between said cover and the end of the axle, said block being clamped in place by application of said cover and having a bearing against said cover to transmit end thrust thereto, said thrust block also having an arc-shaped projection for engagement with an annular inwardly facing surface on the journal but normally out of contact therewith.

5. In a journal box having roller bearings arranged between the journal and the housing, a retainer for the bearings lying substantially within the mouth of the box; a thrust block for the journal lying substantially without the mouth of the housing and extending over the end of said journal; and a cover bolted to the housing interlocking with retainer and thrust block to secure them in the box, said thrust block having a bearing upon said cover in line with the end of said journal.

6. In a journal box having roller bearings arranged between the journal and the housing, a closure for said box, a unitary end thrust bearing secured between said box and said closure and formed with inwardly and outwardly facing bearing surfaces, a rotatable axle within said box having an annular recess adjacent its end forming inwardly and outwardly facing thrust surfaces, said surfaces being normally spaced from the surfaces on said end thrust bearing whereby said axle is capable of limited endwise movement in either direction relative to the box.

7. In a device of the class described a journal box, an axle journalled in said box and having a groove around its periphery near the outer end, a removable end closure for said box substantially opposite the end face of the journal adapted to be bolted to the box, and a thrust bearing member, said box, cover and member having cooperating portions so constructed and arranged that said member will be rigidly clamped in position by said closure upon securing the latter to said box, said bearing member having a thrust surface adapted to cooperate with the end of said axle and another surface adapted to co-operate with a wall of said groove.

8. In a device of the class described a journal box, an axle journalled therein, said axle having a groove around its periphery near one end, roller bearing members between said box and axle, a retaining ring fitting within said box and adapted to retain said members in position, a thrust bearing element engaged in said groove and adapted to receive the thrust of said box relative to the axle in both directions, and an end closure adapted to be bolted to said box, said closure serving to clamp said element and ring in position and secure the same to said box.

9. In a device of the class described a journal box, an axle journalled therein, a detachable closure for the end of said box opposite the end face of said axle, and a thrust block so constructed and arranged in relation to said box and closure as to be clamped to said box upon attachment of said closure, said block having thrust surfaces for cooperation with surfaces on said axle to receive the relative thrusts between said axle and journal box in either direction, there being a substantial clearance between one of said thrust surfaces and its cooperating surface at all times.

ALBERT O. BUCKIUS.